United States Patent [19]

Matthias et al.

[11] Patent Number: 4,840,398
[45] Date of Patent: Jun. 20, 1989

[54] DRIVE ARRANGEMENT FOR A ROLL BAR OF MOTOR VEHICLES

[75] Inventors: Klaus Matthias, Sindelfingen; Karl-Heinz Baumann, Bondorf; Gerald Schick, Garching; Arno Disson, Grafenau; Hermann Möller, Gärtringen; Holger Seel, Aidlingen; Claus Töpfer, Sindelfingen; Uwe Nerger, Sindelfingen; Peter Thiele, Sindelfingen; Eugen Fleisch, Rottenburg, all of Fed. Rep. of Germany

[73] Assignee: Daimler-Benz Aktiengesellschaft, Stuttgart, Fed. Rep. of Germany

[21] Appl. No.: 249,182

[22] Filed: Sep. 26, 1988

[30] Foreign Application Priority Data

Sep. 26, 1987 [DE] Fed. Rep. of Germany ....... 3732562

[51] Int. Cl.$^4$ ............................................. B60R 21/00
[52] U.S. Cl. ................................................. 280/756
[58] Field of Search ...................... 280/748, 753, 756; 296/112, 113, 117; 180/271

[56] References Cited

U.S. PATENT DOCUMENTS

| | | | |
|---|---|---|---|
| 3,292,726 | 12/1966 | Jette, Jr. | 280/753 |
| 3,420,572 | 1/1969 | Bisland | 280/753 |
| 4,557,502 | 12/1985 | Scaduto et al. | 280/756 |
| 4,695,089 | 9/1987 | Fukutomi et al. | 280/756 |
| 4,715,468 | 12/1987 | Baumann et al. | 280/756 |

FOREIGN PATENT DOCUMENTS

1555955 10/1970 Fed. Rep. of Germany .

Primary Examiner—Charles A. Marmor
Assistant Examiner—R. Weaver
Attorney, Agent, or Firm—Barnes & Thornburg

[57] ABSTRACT

A piston-cylinder unit, which erects a swingable roll bar in a crash situation by an ejection spring, includes a controllable drive by which the movement and the direction of movement of the piston can be controlled and which can be disengaged in the event of a crash pulse, whereupon the piston extends rapidly by virtue of the ejection spring.

23 Claims, 8 Drawing Sheets

DRIVE ARRANGEMENT FOR A ROLL BAR OF MOTOR VEHICLES

BACKGROUND AND SUMMARY OF THE INVENTION

The invention relates to a drive arrangement for roll bar of motor vehicles which are raised and locked in an extended position in response to a crash condition.

DE-OS 1,555,955, or U.S. Pat. No. 3,292,726, describes a roof reinforcing bar for motor vehicles which is held at each end by a telescopic support fixed to the motor vehicle chassis and comprises a piston-type telescopic extension which can be extended out of a cylinder and can be transferred by a compression spring out of a retracted position into an extended position. It is possible thereby to move the roof reinforcing bar out of the rest position into its supporting position.

Following the emission of a crash pulse, the extension movement of a roll bar, supporting the vehicle in the event of a roll-over on the ground, must take place rapidly and is achieved with a sufficiently high speed by prestressed compression spring acting on the extending piston.

However, many vehicle occupants absolutely refuse to drive a motor vehicle on which the roof has been removed unless the roll bar is in the erected supporting position. At the same time, it is perceived as unpleasant if the roll bar is erected abruptly by the compression spring. Another disadvantage is that it is not possible to interrupt the extension movement and to halt the roll bar before it has reached its end position. Thus a person sitting in the back risks being injured by the movement of the roll bar. It is equally impossible for the roll bar to be automatically retracted when required. Given a highly prestressed compression spring, it must be pressed back into its rest position with the exertion of a large force.

A motor drive roll bar is shown in U.S. Pat. No. 4,557,502.

It is the object of the present invention to make a roll bar which can be extended rapidly into its supporting position in a crash situation and usable even without a crash pulse.

This object is achieved by the following characterizing features.

The driven piston can be extended and also retracted at a moderate pace and by virtue of this the movement of the roll bar also proceeds slowly and in controllable manner. Should the roll bar endanger an occupant during its controlled movement, the roll bar can be halted and its direction of movement reversed.

If a crash pulse is triggered during the controlled movement, the action of the drive on the piston is cancelled, thereby causing the roll bar, driven by the ejection spring, to extend rapidly into its supporting position.

It is possible to lock the support piston in any position against being driven. Thus the roll bar supports the vehicle in the event of a roll-over even when, in an unfavorable case, it has not yet quite reached its fully extended supporting position. If an additional piston-cylinder unit is chosen as drive for the support piston, then it is advantageous to connect these pistons releasably via a crash coupling. Thus, following a crash pulse, the drive can be disconnected from the support piston, which then moves out unretarded and accelerated by the ejection spring into its supporting position. The same result can be achieved if the cylinders of the two piston-cylinder units are locked releasably to one another. In this arrangement, following a crash pulse, the drive piston together with its cylinder is carried along by the spring-loaded support piston. Since the cylinder remains in alignment by virtue of a guide sleeve, it can be driven back along the guide sleeve into the locking arrangement in order to re-establish the connection between the two cylinders.

In one possible embodiment of a crash coupling which, after being complemented by loading the locking pin with a prestressed stressing spring, it becomes a prestressable crash coupling which does not require an external control signal at the crash coupling to re-establish the connection between the two pistons.

Further appropriate embodiment of a drive and possible embodiments of a locking arrangement for the support and the drive cylinder are also described.

Other objects, advantages and novel features of the present invention will become apparent from the following detailed description of the invention when considered in conjunction with the accompanying drawings.

DETAILED DESCRIPTION OF DRAWINGS

Figure 1:
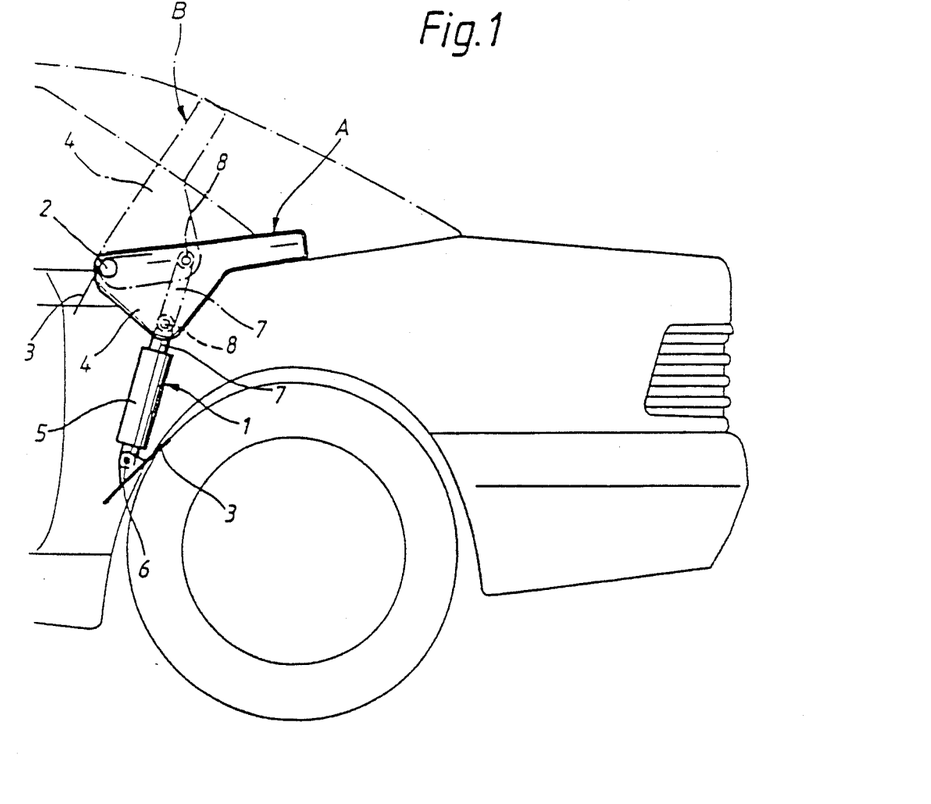
FIG. 1 is a side view of a rear part of a motor vehicle with a swingable roll bar in the lowered rest position and in the erected supporting position, in phantom.

FIG. 1 shows a piston-cylinder unit 1 for the erection of a roll bar 4, which is swingably mounted on a vehicle chassis 3 via a bearing 2, out of a lowered rest position A into an erected supporting position B, represented in chain-dotted lines.

At the lower end of its support cylinder 5, the piston-cylinder unit 1 has a lower eyelet 6 for pivotable attachment to the vehicle chassis 3, and at the upper end of its support piston 7 has an upper eyelet 8 for pivotable attachment to the roll bar 4. Following a control pulse triggered by a crash situation, the support piston 7 is extended extremely rapidly thereby bringing the roll bar into the erected supporting position B, in which it protects the occupants from injury if the vehicle rolls over.

As illustrated in the exemplary embodiments, a locking arrangement by which the support piston 7 can be arrested in various positions can be rendered inoperative by a control pulse, whereupon the support piston 7 is rapidly extended by a prestressed ejection spring arranged concentrically around the piston.

Figure 2:
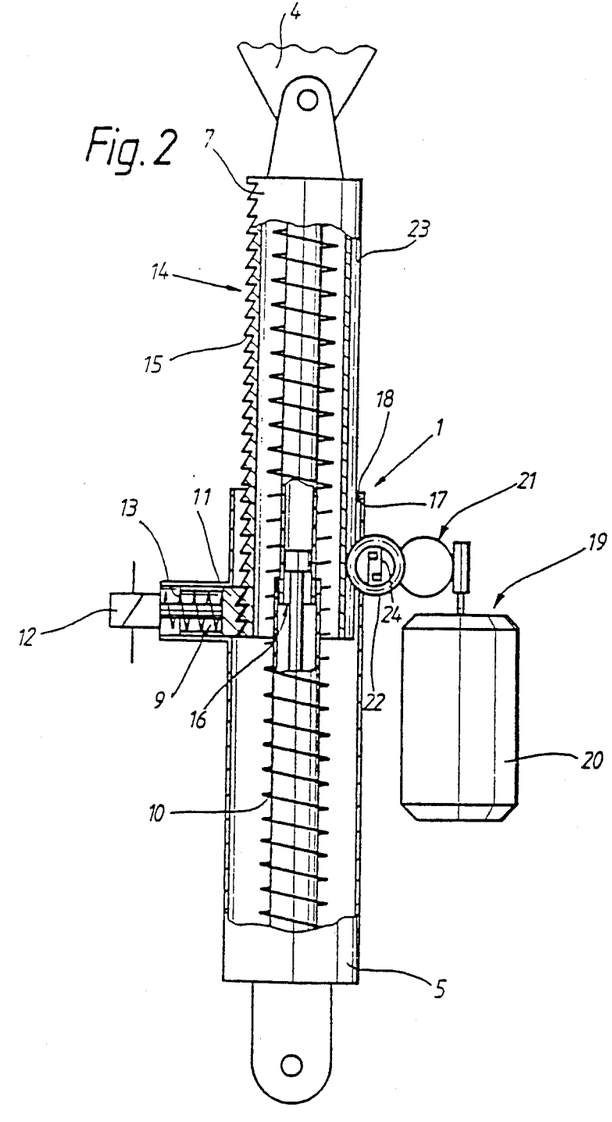
FIG. 2 is a partial cutaway view of a support piston which can be controlled by an electric motor via a self-locking gear, having an electromagnetically actuable coupling for separation in a crash and an electromagnetically actuable locking slide, according to the present invention.

In FIG. 2, a locking arrangement 9 comprises a locking slide 11 which can be brought into an inoperative position by a solenoid 12 and which is displaced back into the operative position by a prestressed compression spring 13 after the solenoid 12 has been switched off. A row of locking teeth 15, which is formed as a rack 14 along a longitudinal axis of the casing of the support piston 7, and into which the locking slide 11 engages in the operative position, has a locking effect in the retraction direction of the piston 7, whereby the support piston 7 can no longer be displaced in the retraction direction and hence supports the position of the roll bar 4.

During the rapid extension of the support piston 7 as a result of a crash pulse and the thereby de-energized solenoid 12, the locking slide 11 is held against the row of locking teeth 15 by the pressure spring 13. Thus, if it were not possible for the extension movements to be fully completed, the support piston 7 is in all cases locked against a retraction movement even in a position in which it is not fully extended.

The control of the solenoid 12 is by a known system which senses a crash condition and is capable of producing a crash pulse.

Within the piston-cylinder unit 1 there is a damping system 16, by which the desired speed profile of the extension movement of the support piston 7 can be determined using an appropriately selected damping oil largely unaffected by temperature, and stops 17 and 18 which are fixed to the piston and the cylinder and limit the extended end position of the supporting piston 7.

Since, in accordance with the invention, it should be possible even without a crash pulse for the roll bar to be controlled and erected at a moderate pace and also lowered again, a drive 19, which is controllable, switchable by a vehicle occupant, controls the movement and the direction of movement of the spring-loaded support piston 7. The drive 19 includes an electric motor 20 and a self-locking gear 21 which engages piston support by a driven pinion 22 in an involute toothing 23 extending along a longitudinal axis of the casing of the support piston 7. To ensure that, in the event of a crash pulse, the drive 19 can be uncoupled from the support piston 7, which is thereupon extended rapidly by an ejection spring 10, a coupling or clutch 24 is arranged upstream of the driven pinion 22.

With the coupling 24 engaged, the support piston 7 is arrested by the self-locking of the gear 21 and by the locking slide 11 in any chosen position.

Figure 3:
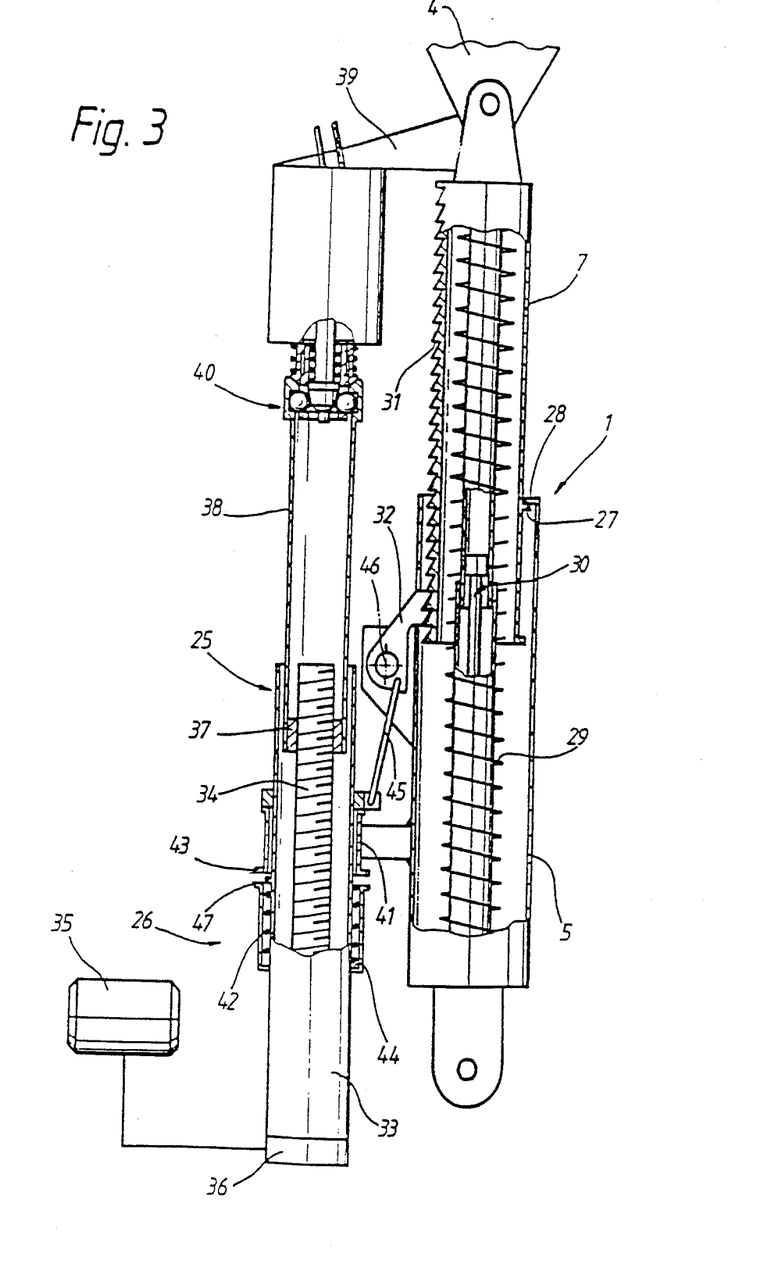
FIG. 3 is a partial cutaway view of an additional piston-cylinder unit which can be extended by an electric motor having a self-locking gear and of a lifting spindle, having a crash coupling between the support piston and the drive piston and a mechanical positive control arrangement for a locking catch, according to the present invention.

In FIG. 3 an additional, controllable piston-cylinder unit 25 is provided which acts, in accordance with a controllable drive 26, on a piston-cylinder unit 1 which swivels the roll bar 4.

The piston-cylinder unit 1 comprises a support cylinder 7 which can be displaced in a support cylinder 5 in a manner limited by stops 27 and 28 fixed to the piston and cylinder respectively and the speed profile of whose rapid extension movement, effected by a concentrically arranged, prestressed ejection spring 29, is controlled by a damping system 30 employing damping oil which is relatively unaffected by temperature. Along one longitudinal axis of the casing, the support piston 7 has a row of locking teeth 31 which lock in the retraction direction and with which a positively controlled locking catch 32 can be brought into engagement.

A cylinder 33 of the additional piston-cylinder unit 25 is connected to the support cylinder 7. A lifting spindle 34 is mounted in the longitudinal direction in this cylinder 33. A self-locking worm gear 36 driven by an electric motor 35 and not shown in greater detail, acts on spindle 34. A grooved nut 37 on spindle 34 can be displaced longitudinally by the rotation of the lifting spindle 34 in the cylinder 33 and to which a drive piston 38 of the additional piston-cylinder unit 25 is connected. The drive piston 38, which can be extended and retracted in the cylinder 33 by the electric motor 35, is firmly connected to the support piston 7 by a connecting piece 39. Therefore, it is possible for the roll bar 4 to be erected and lowered again at a moderate pace by motor 35. By virtue of the self-locking of the worm gear 36 and the locking effect of the positively guided locking catch 32, the roll bar 4 is arrested in any position. To ensure that following a crash pulse, the drive piston 38 can be uncoupled from the support piston 7, which thereupon extends rapidly in a desired manner. A crash coupling 40 in which a positive connection between the drive piston 38 and the piece 39 can be electromagnetically broken by a crash pulse is installed between the drive piston 38 and the piece 39, connecting it to the support piston 7.

Figure 8:
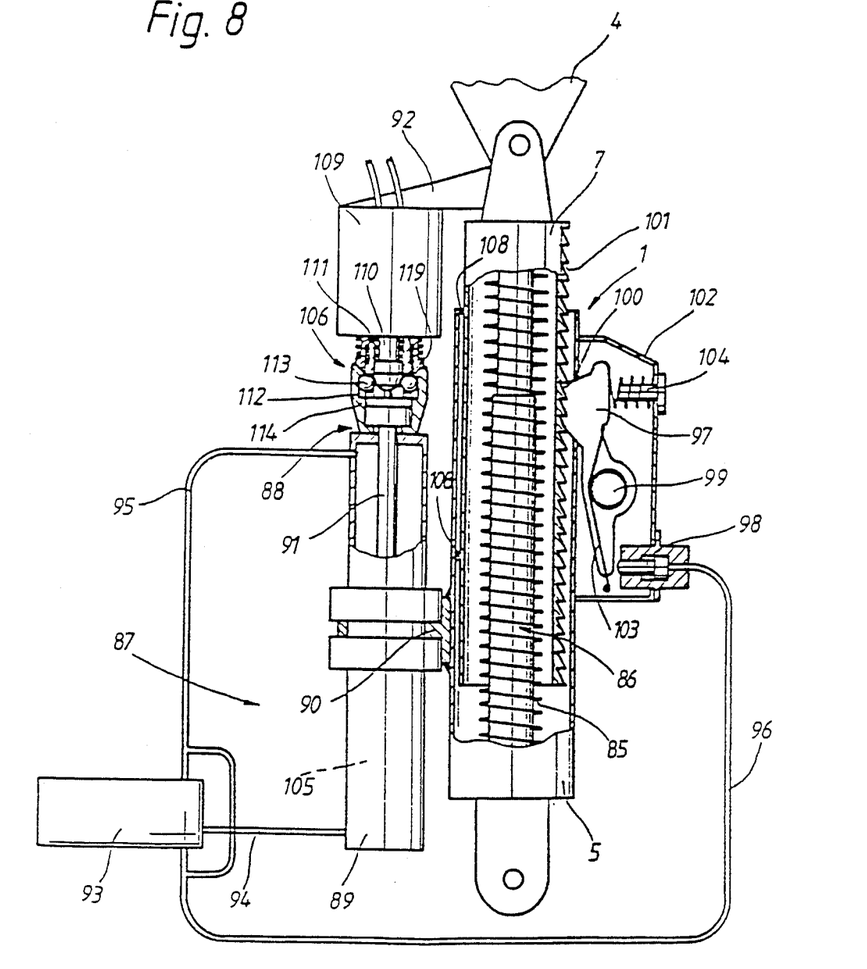
FIG. 8 is a partial cutaway view of a hydraulically controlled additional piston-cylinder unit corresponding to that in FIG. 6, in a retracted rest position.
Figures 9, 10:
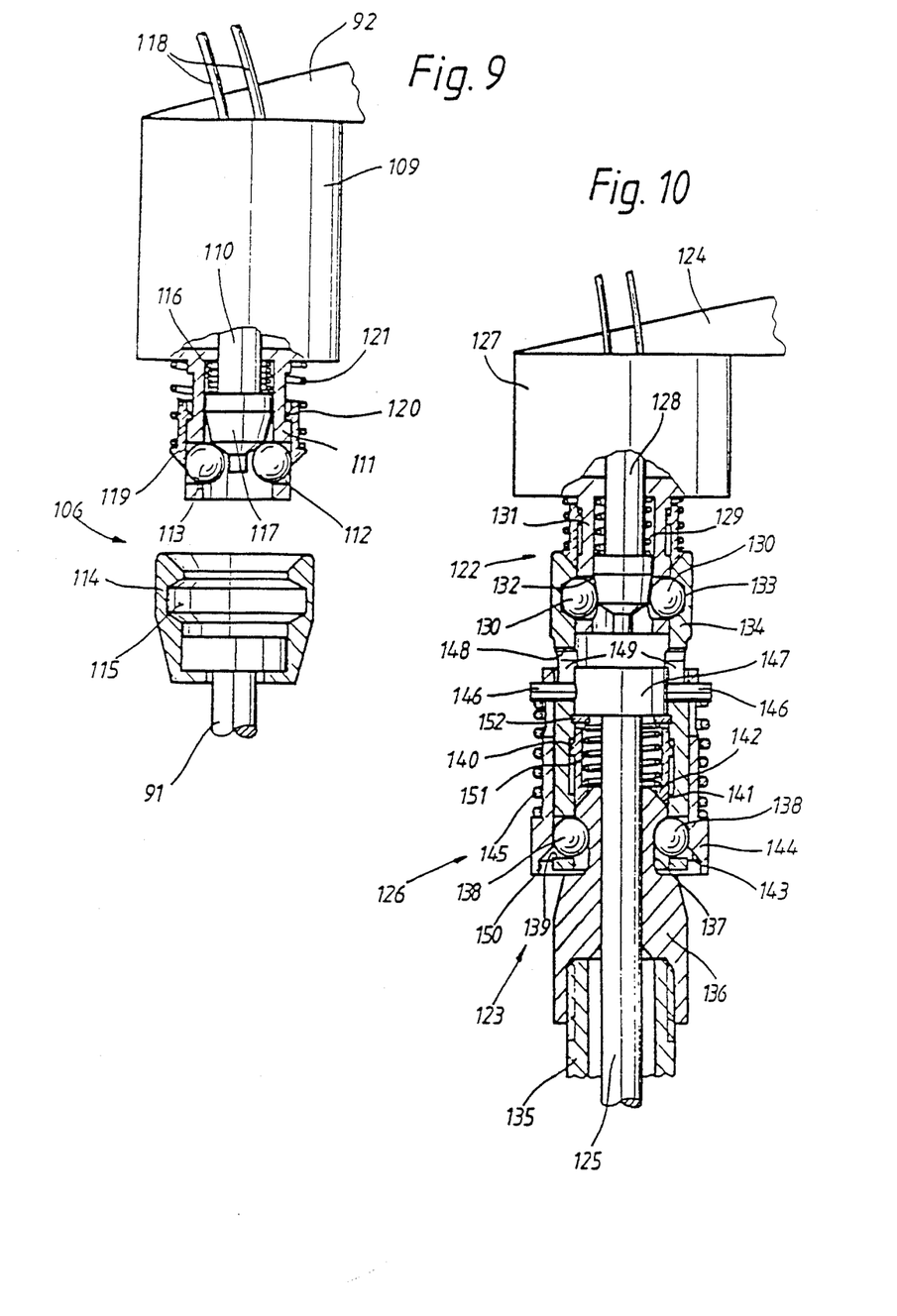
FIG. 9 is a partial cutaway view of a crash coupling which has been opened by a crash pulse, according to the present invention.
FIG. 10 is a partial cutaway view of a closed crash coupling together with an arrangement for locking a retracted drive piston in its cylinder by a snap-in lock, according to the present invention.

The construction and mode of operating of a crash coupling is described in the part of the description pertaining to FIGS. 8 and 9.

Following a crash pulse, the support piston 7 must be capable of begin locked against retraction in whatever erected position has been reached if a vehicle roll-over occurs. Here, this operation is positively controlled by the cylinder 33 of the additional piston-cylinder unit 25, which cylinder can be displaced in limited manner in a guide sleeve 41 which is fixed to the support cylinder 5. Around this cylinder 33 there extends a prestressed compression spring 42 which is supported at one end on a web of the guide sleeve 41 and presses with the other end on a cylinder shoulder 44.

A lever 45 is pivotably attached to the cylinder 33 and engages with its other end at a distance from the pivot 46 of the spring-loaded locking catch 32 and can lift the catch 32 away from the row of locking teeth 31 by a movement in the direction of the toothing. During the retraction of the support piston 7 by the drive piston 38, this movement arises because the prestress of the compression spring 42 is far less than the residual prestress of the ejection spring 29 when the support piston 7 is fully extended. By reason of this fact, during retraction, the drive piston first of all compresses the compression spring 42 and pulls the cylinder 33 by a stop rim 47 against the web 43 of the guide sleeve 41, the lever 45 also being displaced at the same time, which lever disengages the locking catch 32. Immediately thereafter, with the further retraction movement of the drive piston 38, the support piston 7 too is retracted into the support cylinder 5 and the roll bar 4 is hence folded down.

In the case where the extension movement of the pistons 7 and 38 is controlled by the drive, the compression spring 42 is compressed by the prestressing force of the ejection spring 29. The lever 45 thereby disengages the locking catch 32 by reason of the movement of the cylinder 33. If the drive 26 is halted and an external force acts upon the roll bar 4, the roll bar 4 is pushed in a short way, but the ejection spring 29 is at the same time compressed and the cylinder 33, together with the lever 45, is also displaced. The spring-loaded locking catch 32 thereby comes into engagement with the row of locking teeth 31 and locks the roll bar 4 against any further swinging in.

Following a crash signal, by which the crash coupling 40 is released and the drive 26 becomes inoperative, the support piston 7, driven only by the ejection spring 29, extends rapidly. The compression spring 42 is able to relax, presses against the cylinder shoulder 44 and displaces the cylinder 33 together with the lever 45 until the locking catch 32 has engaged. During this rapid extension of the support piston 7, the teeth of the locking catch are guided over the row of locking teeth 31 and, if the roll bar 4 is subjected to load in the opposite direction, the locking catch engages immediately, thereby preventing retraction of the support piston 7.

Figure 4:
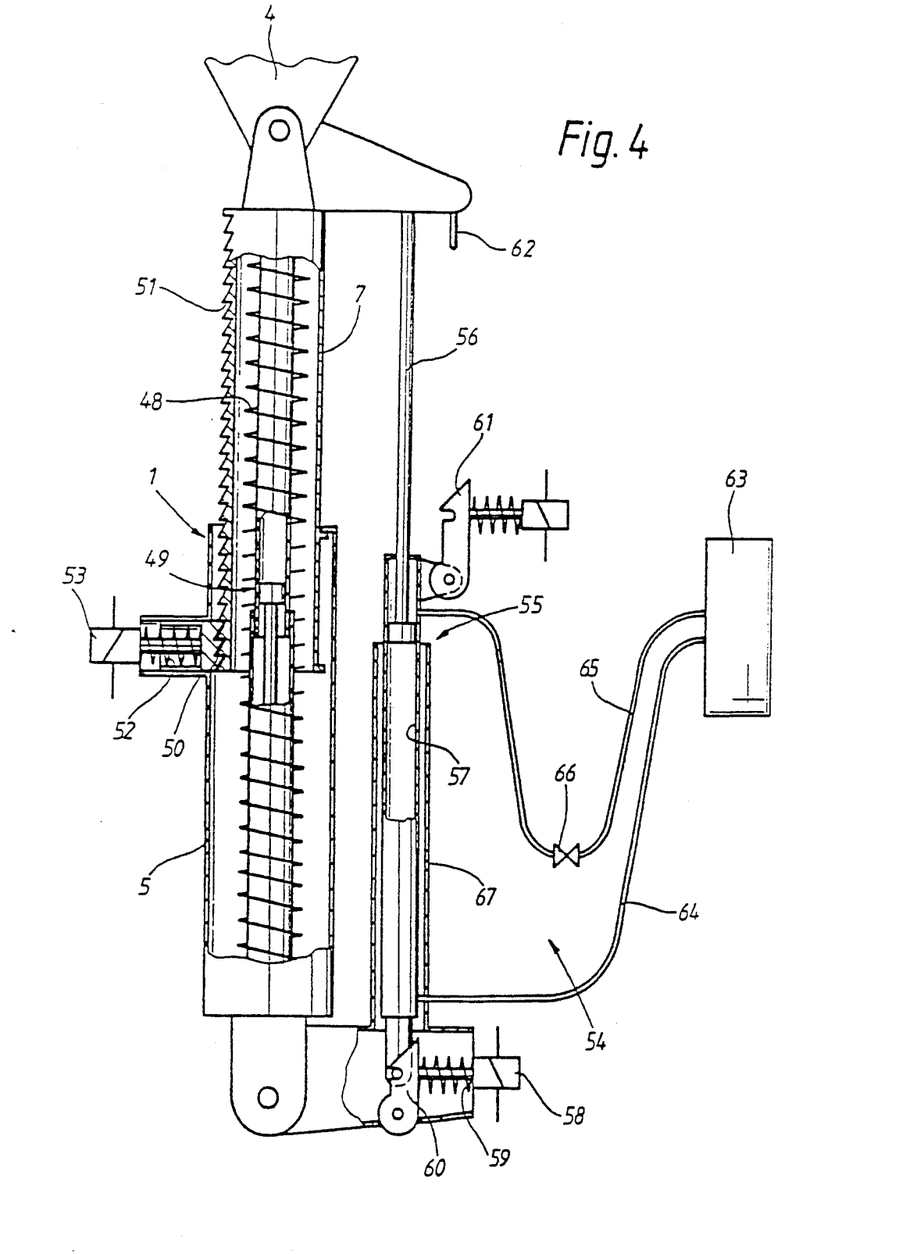
FIG. 4 is a partial cutaway view of a hydraulically controlled additional piston-cylinder unit having a cylinder which in the event of a crash can be unlocked and displaced in a guide sleeve, and having electromagnetic actuation of a locking slide, according to the present invention.

FIG. 4 illustrates the embodiment in which a piston-cylinder unit 1 which moves a roll bar 4 again comprises a support cylinder 5 and a support piston 7 which can be displaced therein and is extended by an ejection spring 48 and whose speed is regulated by a damping system 49 which is relatively unaffected by temperature. Along one longitudinal axis of the casing, the support piston 7 has a row of locking teeth 51 which, in the retraction direction, cooperate in locking manner with a locking slide 50. The locking slide 50 is driven into engagement by a spring 52 and disengaged by a solenoid 53 during a movement controlled by a drive 54. A controllable drive 54 includes an additional, hydraulic piston-cylinder unit 55, arranged in parallel to piston-cylinder units. The drive piston 56 of piston-cylinder unit 55 is firmly connected to the support piston 7 via an intermediate piece and the cylinder 57 is releasably linked to the support cylinder 5 via a catch 60 which can be disengaged by a solenoid 58 and engaged by a compression spring 59.

A further spring-and solenoid-controlled catch 61 is attached to the cylinder 57. When the drive piston 56 is fully retracted, catch 61 engages in a hoop 62, which can be moved together with the drive piston 56 to retain the drive piston 56 so that its position does not change even though the hydraulic mechanism of piston-cylinder unit 55 is switched off.

The drive piston 56, which is here designated as a differential piston, is moved by a hydraulic unit 63 which, via flexible hydraulic lines 64 and 65 and a throttle valve 66 which may have been connected in between, determines the direction of movement and the movement of the drive piston 56.

In a simplified embodiment, a drive piston can be designated as a single-action hydraulic piston which is retracted by the action of a hydraulic unit and extended by the action of another compression spring.

If a crash pulse occurs, the solenoid 58 pulls the catch 60 towards itself and thus breaks the connection of the cylinder 57 to the support cylinder 5. The support piston 7 is immediately and rapidly extended by the action of the ejection spring 48 and the roll bar 4 is erected. The cylinder 57, which is guided in a guide sleeve 67, is pulled along at the same time. To re-establish the drive 54, the cylinder 57 is subjected to oil pressure via line 64, thereby being pressed back in the guide sleeve 66 until it is locked by the catch 60, whose solenoid 58 is switched so as to be de-energized.

The solenoid 53 is de-energized by the crash pulse, and the locking slide 50 is brought into engagement by the spring 52, sliding over the row of locking teeth 51 during the rapid extension movement and immediately supporting the support piston 7, if the roll bar 4 is loaded in the retraction direction. It would not be possible by the hydraulic drive 54 alone to achieve with absolute certainty the required rapid extension movement following a crash pulse, since the viscosity of the hydraulic oil, which is conventional in vehicles and by which the hydraulic unit 63 controls other functions in the vehicle, is too temperature-dependent. Thus, the necessary erection speed of the roll bar 4 would not be guaranteed.

Figure 5:
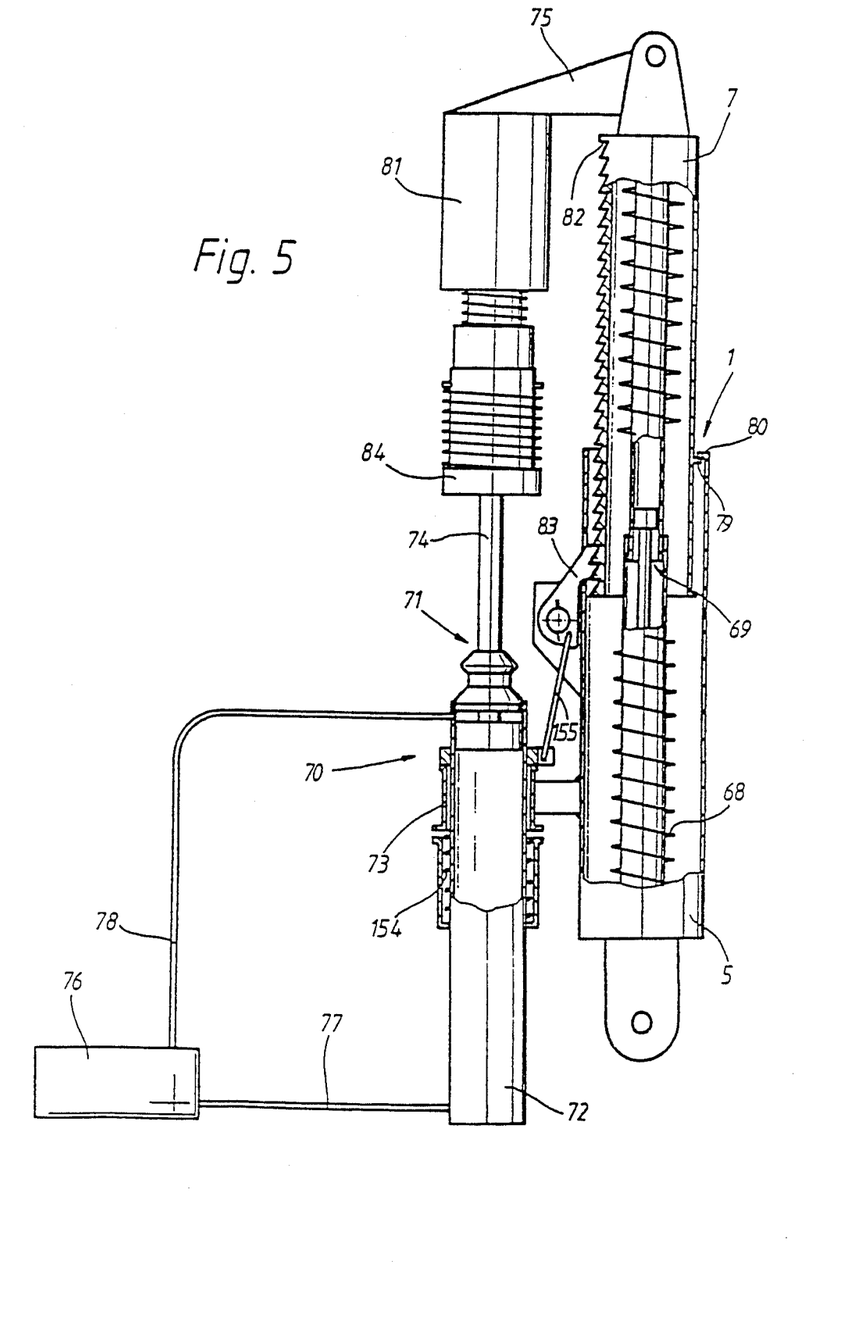
FIG. 5 is a partial cutaway view of a hydraulically controlled additional piston-cylinder unit having a mechanical positive control arrangement for a locking catch and having a crash coupling and an automatic arrangement for locking the retracted drive piston in its cylinder by a snap-in lock, according to the present invention.

In FIG. 5, a piston-cylinder unit 1 comprises a support cylinder 5 and a support piston 7 which is displaceably guided therein can be rapidly extended by an ejection spring 68 and whose extension speed can be controlled by a damping system 69 which is relatively unaffected by temperature.

A regulable drive 70 includes an additional, hydraulic piston-cylinder unit 71 which includes a guide sleeve 73 attached to the support cylinder 5 and a drive piston 74 connected to the support piston 7 via a connecting piece 75.

Pressure oil is applied under control to the drive piston 74 in two opposite directions by a hydraulic unit 76 via two hydraulic lines 77 and 78. The support piston 7 extends and retracts with the same speed as the drive piston 74 by virtue of the connecting piece 75 and this extension movement is limited by the stops 79 and 80 fixed to the piston 7 and the cylinder 5.

To ensure that, following a crash pulse, the drive piston 74 can be uncoupled from the support piston 7, which thereupon extends rapidly, a crash coupling 81, in which a positive connection between the drive piston 74 and the connecting piece 75 can be electromagnetically broken by a crash pulse, is installed between the connecting piece 75 and the drive piston 74.

The construction and operation of a crash coupling will be described in the part of the description pertaining to FIGS. 8 and 9.

For the eventuality of a vehicle roll-over, the support piston 7 must, following a crash pulse, be capable of being locked in whatever position has been reached against retraction as a result of the action of forces from outside. Along a longitudinal axis of casings, the support piston 7 has a row of locking teeth 82, which lock in the retraction direction and into engagement with which a controllable, spring-loaded locking catch 83 can be brought.

The control of this process by a compression spring 154 and a lever 155 which moves the locking catch 83 has already been described in detail in the description of FIG. 3.

To ensure that the hydraulic drive piston 74 is fixed in its fully retracted position, a hydraulically controlled, mechanically locking engaging lock 84 is provided at the upper end of the cylinder 72. Engaging lock 84 holds the retracted drive piston 74 positively at the cylinder 72 and no creep, for example as a result of the passage of leaking oil between the drive piston 74 and the cylinder 72, can occur, even though the hydraulic unit 76 is switched off.

The construction and operation of a locking arrangement of this kind is described in the part of the description pertaining to FIG. 10.

Figures 6, 7:
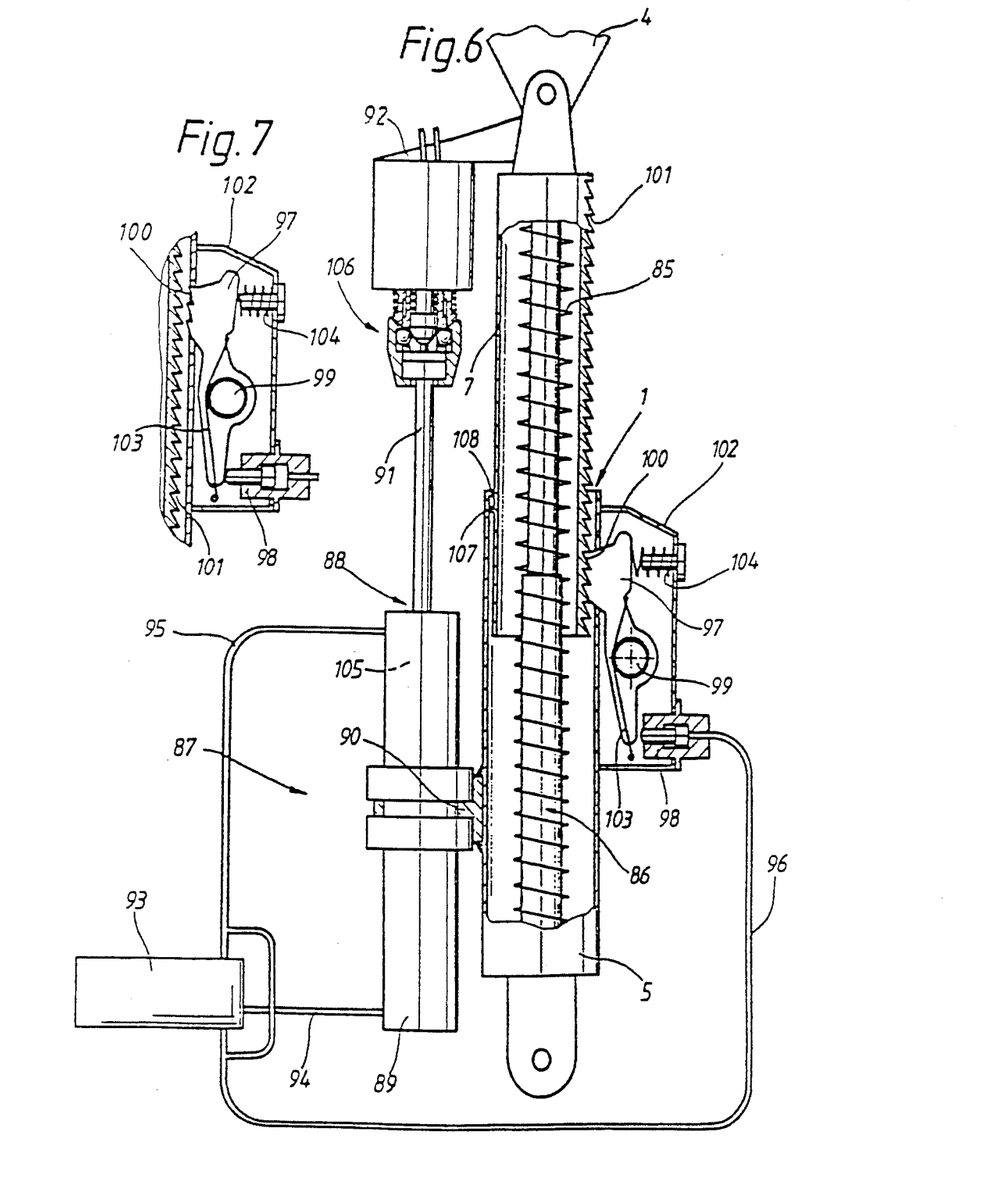
FIG. 6 is a partial cutaway view of a hydraulically controlled additional piston-cylinder unit in an extended supporting position with a hydraulic positive control arrangement for a locking catch, according to the present invention.
FIG. 7 is a partial cutaway view of a hydraulically controlled locking arrangement in the unlocked position, according to the present invention.

FIGS. 6 and 8 show a further embodiment of the drive in an extended position, in which a roll bar 4 is erected in the support position, and in a retracted position, in which the roll bar 4 is folded down respectively. A piston-cylinder unit 1 comprises a support cylinder 5 and a support piston 7 which is displaceably guided therein and can be extended rapidly by an ejection spring 85 and which extension speed is controlled by a damping system 86 which is relatively unaffected by temperature.

A controllable drive 87 includes an additional hydraulic double-acting piston-cylinder unit 88, arranged parallel to the piston-cylinder unit 1. The piston-cylinder unit 88 includes a cylinder 89 attached resiliently at a bracket 90 of the support cylinder 5 and a drive piston 91 connected to the support piston 7 via a connecting piece 92.

Pressure oil is applied under control to the drive piston 91 in two opposite directions by a hydraulic unit 93 via two hydraulic lines 94 and 95. The support piston 7 extends and retracts at the same speed as the drive piston 91 by virtue of the connection.

A locking catch 97, which is likewise actuated by the hydraulic unit 93 via a hydraulic control line 96, can be pivoted about a bearing bolt 99, as illustrated in greater detail in FIG. 7, by the action of a hydraulic pressure cylinder 98, lifting its toothing 100 off a row of locking teeth 101 which is formed along a longitudinal axis of the casing of the support piston 7. The locking catch 97 is pressed into the row of locking teeth 101 by the action of two springs 103 and 104, which are supported on a holding part 102 fixed to the cylinder, whereupon it prevents the support piston 7 from being driven in or retracted.

To ensure that the hydraulic drive piston 91 is fixed in its fully retracted position against a creeping automatic extension movement when the hydraulic lines 94, 95 have been switched so as to be depressurized, an engaging lock 105 can likewise be provided in the cylinder 89. A design of this engaging lock may be in accordance with that in FIG. 10.

In the case of a slow retraction and extension movement of the pistons 7 and 91, a so-called "easy actuation" of the roll bar 4, the movement of the roll bar 4 can if required also be halted or reversed without problems by a corresponding control of the drive piston 91. The locking catch 97 is put out of engagement by the action of the pressure cylinder 98 for reasons of wear and noise during the easy actuation.

If a crash pulse occurs, a crash coupling 106 which couples the connecting piece 92 to the drive piston 91 immediately breaks this connection. The ejection spring 85 then rapidly extends the support piston 7 independently of the drive 87, until it is limited by stops 107 and 108 fixed to the piston and the cylinder, and erects the roll bar 4. During this procedure, the hydraulic lines 95 and 96, which are directly connected to one another, are switched as so to be depressurized so that the locking catch 97—pressed by the springs 103 and 104—runs over the row of locking teeth 101 and, in the case of loading of the roll bar 4 by a force acting thereon in the retraction direction, engages in the row of locking teeth 101 and prevents a retraction movement of the support piston 7 and thus supports the roll bar 4. The shape of the toothing 100 of the locking catch 97 and that of the row of locking teeth 101 leads to their locking effect being increased even further by pressure on the roll bar 4.

A crash coupling will now be described in accordance with the embodiment in FIG. 8 and that illustrated on an enlarged scale in FIG. 9.

The crash coupling 206 serves to connect a connecting piece 92 attached to the support piston 7 to the drive piston 91. An electromagnet 109, which serves to open the crash coupling 106, adjoins the connecting piece 92 and moves a locking pin 110 which serves to lock and unlock the connection. Coaxially around the locking pin 110 and likewise attached to the electromagnet 109, there is a sleeve 111 which has wall bores 112 into which inner locking balls 113 can be pressed by the locking pin 110 until they protrude beyond the periphery of the sleeve 111.

At its end to be connected, the drive piston 91 merges into a bushing body 114, by which it fits round the sleeve 111 in the envisaged connecting position, and has an inner annular grove 115 into which the locking balls 113 projecting beyond the periphery of the sleeve protrude, thereby positively connecting the sleeve 111 to the bushing body 114. The locking balls 113 are displaced into the annular grove 115 by the locking pin 110 being placed by a stressing spring 116 into a pushed-forward position in which it presses the locking balls 113 through the wall bores 112 by an integrally formed cone 117.

In the event of a crash pulse, the electromagnet 109 is supplied with current via the wires 118 and generates an electromagnet field by which the locking pin 110 is brought into a retracted position against the spring force of the stressing spring 116. The locking balls 113 thereby are guided out of the annular groove 115 into the interior of the sleeve 111 by the pull on the sleeve 111 exerted by the ejection spring 85 of piston-cylinder unit 1 and breaking the positive connection to the bushing body 114. In this arrangement, the pull-off movement of the bushing body 114 is followed by a blocking slide 119 which, limited by a stop 120, is pressed in the direction of the bushing body 114 by a spring 121 arranged coaxially around the sleeve 111 and closes the wall bores 112 to prevent the locking balls 113 from falling out.

Once the magnetic field has been cancelled, the locking pin 110 is pushed forward by the stressing spring 116 and pressed against the locking balls 113 which block its path and whose path is limited by the blocking slide 119. The crash coupling 106 is thereby prestressed for the re-establishment of the connection. For a renewed connection, the drive piston 91 is driven with the bushing body 114 against the blocking slide 119 which is then pushed back against the force of spring 121. Once coincidences of the annular groove 115 with the wall bores 112 has been achieved, the locking balls 113 are pressed into the annular grove 115 by the locking pin 110 stressed by the spring 116 and once more establish a positive connection between the drive piston 91 and the connecting piece 92 and the support piston 7.

FIG. 10 illustrates a crash coupling 122 together with an engaging lock 123.

The crash coupling 122 establishes a releasable connection between a connecting piece 124 which is fixed to the support piston 7 and a drive piston 125 of an additional piston-cylinder unit 126. The drive piston 125 serves as controllable drive 153.

An electromagnet 127 and a longitudinally displaceable, spring-loaded locking pin 128 are mounted on the connection piece 124. The locking pin 128 is pressed by a stressing spring 129 against locking balls 130 which are mounted in wall bores 132 in a sleeve 131 adjoining the electromagnet 127. When the wall bores 132 coincide with an inner annular groove 133 of a bushing body 134, which is mounted on the drive piston 125, and in the envisaged connecting position fits over the sleeve 131, the balls 130 are also pressed into the annular groove 133 by the locking pin 128 and hold the bushing body 134 on the sleeve 131. Further details of the construction and mode of operation of a crash coupling of this kind are described in the part of the description pertaining to FIG. 9.

Here, the bushing body 134, in addition, serves to lock the drive piston 125, on which it is mounted, in the retracted position in its hydraulic cylinder 135 and forms part of the engaging lock 123. When the drive piston 125 is retracted engaging lock 123, at one end, fits over a sleeve 136 which is fixed to the cylinder 135. The sleeve 136 is arranged coaxially around the drive piston 125 and has an annular groove 137 formed in the periphery and into which during locking, locking balls 138 mounted in wall bores 139 in the bushing body 134, come to lie.

Locking by the engaging lock 123 is effected in the following manner. A blocking slide 141, which can be displaced in the bushing body 134 to an extent limited by a stop 140 and prevents the locking balls 138 from falling into the cavity of the bushing body 134, is displaced axially by a cone 142 of the sleeve 136. The cone 142 presses against blocking slide 141 during the retraction of the drive piston 125 into the cylinder 135. The sleeve 136 follows the cone 142 into the bushing body 134 until the annular groove 137 comes into coincidence with the wall bores 139 of said bushing body. The locking balls 138, which are stressed by an inner cone 143 of a blocking slide sleeve 144 coaxially surrounding the bushing body 134, are then immediately pressed into the annular groove 137 and, engaged approximately half-way into the wall bores 139 and with the other half into the annular groove 137, fix the positive locking of the bushing body 134 on the sleeve 136.

During this, the blocking slide sleeve 144 is stressed by the force of a prestressed compression spring 145 which is supported on radially projecting, pin-shaped extensions 146 of a head piece 147 placed on the end of the drive piston 125.

At the beginning of the extension movement of the drive piston 125, the extensions 146 pull the blocking slide sleeve 144 along with them until the extensions 146 themselves come to rest on an end stop 148 of a respective guide slot 149 of the bushing body 134. At the same time, the path of the locking balls 138 out of the annular groove 137 becomes free and they then come to lie partially in a recess 150 of the blocking slide sleeve 144, at the same time cancelling the connection between sleeve 136 and bushing body 134.

By virtue of a spring 151 stressing it in this direction, the blocking slide 141 follows the sleeve 136 and prevents the locking balls 138 from falling out of the wall bores 139.

Following the release of locking in the engaging lock 123, the head piece 147 is displaced back by the pull acting on the connecting piece 124 and exerted by the highly prestressed ejection spring in the support cylinder and rests against a supporting ring 152 fixed to the bushing body. The extensions 146 of head piece 147 at the same time also compresses the compression spring 145 which presses the blocking slide sleeve 144 by its cone 143 against the locking balls 138. The engaging lock 123 thereby is prestressed for a renewed locking operation.

The arrangement of an engaging lock of this kind or also of an engaging lock in accordance with the embodiment of the crash coupling is likewise conceivable within the cylinder, e.g., in the region of the cylinder base.

Regarding the arrangement of the drive arrangement at the roll bar, it is to be noted that it is advantageous to have a supporting piston-cylinder unit engaging the roll bar on both sides of the vehicle, while it is sufficient to couple only one of these piston-cylinder units releasably to a controllable drive.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A drive arrangement for a motor vehicle roll bar, comprising:
   at least one piston-cylinder means including a support piston, guide cylinder and ejection spring for extending a roll bar, in response to a control pulse triggered by a crash situation, from a lowered rest position to an erected supporting position;
   a controlled release locking means for releasing the support piston so that it can be extended out of said guide cylinder by an ejection spring and relocking said support piston in an extended end position;
   drive means, connected to said at least one piston-cylinder means, for controlling the direction of movement and the speed of the spring-loaded support piston;
   and cancelling means for cancelling the influence of the drive means on the spring-loaded support piston in response to a crash signal.

2. A drive arrangement according to claim 1, wherein said locking means locks the support piston against a retraction movement in an extended position.

3. A drive arrangement according to claim 2, wherein said locking means include a row of locking teeth along a longitudinal axis of a casing of the supporting piston and a controllable locking element which engages said teeth to prevent retraction of said support piston.

4. A drive arrangement according to claim 1, wherein said drive means include a self-locking gear driven by an electric motor, and a driven pinion connecting said self-locking gear with an involute toothing arrangement in and extending along a longitudinal axis of the casing; and wherein said cancelling means includes a clutch which can disengage from the drive means.

5. A drive arrangement according to claim 1, wherein the drive means includes a controllable additional piston-cylinder means having a drive piston and drive cylinder.

6. A drive arrangement according to claim 5, including crash coupling means releasably connecting the drive piston of the additional piston-cylinder unit to the support piston.

7. A drive arrangement according to claim 5, wherein the additional piston-cylinder means has a double-acting hydraulic cylinder for hydraulically controlling the speed of the drive piston in the extension and retraction direction.

8. A drive arrangement according to claim 5, wherein said drive means includes a lifting spindle mounted in the longitudinal direction in the drive cylinder, a self-locking worm gear mounted said lifting spindle and driven by an electric motor, and a grooved nut connecting said lifting spindle and driving piston and displaced longitudinally by the rotation of the lifting spindle to move the drive piston.

9. A drive arrangement according to claim 5, including means connecting said drive piston to the support piston; and catch means for locking said drive cylinder to said support cylinder in a lock state and responsive to a crash pulse, to releases the drive cylinder, in an unlock state so that said drive cylinder can be displaced, in a guide sleeve parallel to the support cylinder, with the full stroke of the support piston.

10. A drive arrangement according to claim 3, wherein said locking element includes a solenoid, a locking slide and a spring; said solenoid in an energized state maintains said locking slide out of engagement with the row of locking teeth of the support piston; and in the event of a crash pulse and the solenoid thereby being de-energized said locking slide is displaced by said spring said locking slide into engagement with the row of locking teeth.

11. A drive arrangement according to claim 3, wherein the locking element includes a locking catch and control means for controlling said locking catch to engage the row of locking teeth in the event of a crash pulse, and to disengage said teeth by controlled movement of the drive piston.

12. A drive arrangement according to claim 11, wherein said control means includes:
a guide sleeve which mounts the drive cylinder of the additional piston-cylinder means at the support cylinder and which permits a control stroke, so as to be displaceable to a limited extent relative to each other;
a compression spring supported between the drive cylinder, and the guide sleeve, said compression spring, in the relaxed condition, has a smaller spring pretension than the ejection spring acting on the support piston, and is compressed during a specific movement of the drive piston which also displaces the drive cylinder; and
a lever, connected between said drive cylinder and said locking catch, for lifting the locking catch off from the row of locking teeth by said specific movement of said drive position and drive cylinder.

13. A drive arrangement according to claim 11, wherein said control means includes:
a hydraulically actuated pressure catch cylinder acting against springs for disengaging the locking catch;
a control line of said catch cylinder is connected with a hydraulic line of a double-acting cylinder of the additional piston-cylinder means; and
means for supplying hydraulic pressure to the double-acting cylinder to move said drive piston and to the catch cylinder to lift the spring-loaded locking catch off from the row of locking teeth, and in the event of a crash pulse, for depressurizing the hydraulic lines so that the locking catch thereby being engaged.

14. Drive arrangement according to claim 6, wherein said crash coupling means includes:
a sleeve which is firmly fixed to either the drive piston or the support piston and, in the coupled position, overlaps a bushing body fixed on the other of the drive piston or support position; and
a controllable locking pin to lock and unlock said overlapped sleeve and bushing body by acting on locking balls which, in the locking position, engage in an annular groove of the bushing body and in wall bores of the sleeve.

15. A drive arrangement according to claim 14, including a prestressed stressing spring to bias the locking pin in its locking direction to automatically lock the overlap of the sleeve with the bushing body, after they have coupled.

16. A drive arrangement according to claim 9, including an electromagnetically actuated catch on the drive cylinder for engaging a hoop connected to the drive piston to releasably lock them together in the retracted position of the drive piston and in the lowered rest position of the roll bar.

17. A drive arrangement according to claim 5 including engaging lock means for locking the drive piston of the additional piston-cylinder unit to its drive cylinder against an extending creep movement when the drive piston is in the retracted position and the roll bar in its lowered rest position.

18. A drive arrangement according to claim 17, characterized in that the engaging lock means includes locking balls on the drive piston to be received in an annular groove of the drive cylinder to lock the drive piston to the drive cylinder; and
mounting means connecting a locking slide sleeve to the drive piston for positioning said locking slide sleeve in a retracted position of the drive piston to press the locking balls into said annular groove and for displacing said locking slide sleeve to a limited extent with the extension movement of the drive piston with respect to the drive cylinder to free the path of the locking balls out of the annular groove.

19. A drive arrangement according to claim 18, including a prestressed compression spring, biasing the locking slide sleeve in its locking direction to automatically lock the position of the drive piston following the retraction of the drive piston into the drive cylinder.

20. A drive arrangement according to claim 17, wherein components of the engaging lock which are allocated to the drive piston, are integrally formed.

21. A drive arrangement according to claim 6, wherein component of the crash coupling which are allocated to the drive piston are integrally formed.

22. A drive arrangement according to claim 3 wherein the controllable locking element is actuable in direct dependence on the pressure stressing of a hydraulic drive piston of said drive means.

23. A drive arrangement according to claim 17 wherein the engaging lock means is actuable in direct dependence on the pressure stressing of a hydraulic drive piston of said drive means.

* * * * *